United States Patent
Furui

(10) Patent No.: US 9,781,396 B2
(45) Date of Patent: Oct. 3, 2017

(54) PROJECTOR AND ADJUSTMENT METHOD USING A PLURALITY OF PATTERNS HAVING DIFFERENT LIGHTNESS VALUES

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 66 days.

(21) Appl. No.: 14/220,600

(22) Filed: Mar. 20, 2014

(65) Prior Publication Data

US 2014/0293243 A1  Oct. 2, 2014

(30) Foreign Application Priority Data

Mar. 29, 2013 (JP) ................. 2013-071614

(51) Int. Cl.
H04N 9/31 (2006.01)

(52) U.S. Cl.
CPC ........... H04N 9/3185 (2013.01); H04N 9/317 (2013.01); H04N 9/3179 (2013.01); H04N 9/3182 (2013.01); H04N 9/3188 (2013.01)

(58) Field of Classification Search
CPC .... H04N 9/3182; H04N 9/3185; H04N 9/315; H04N 9/3155; H04N 9/3179; H04N 9/3188; H04N 9/3191; H04N 9/3194
See application file for complete search history.

(56) References Cited

U.S. PATENT DOCUMENTS

| | | | | |
|---|---|---|---|---|
| 7,293,883 B2* | 11/2007 | Miyasaka | ...................... | 353/122 |
| 7,475,995 B2* | 1/2009 | Matsumoto | .......... | H04N 3/2335 345/204 |
| 7,969,455 B2* | 6/2011 | Yoshida | .................... | G09G 3/20 345/690 |
| 8,102,332 B2* | 1/2012 | Nelson | ..................... | H04N 9/31 345/1.1 |
| 8,328,366 B2* | 12/2012 | Nara | ..................... | H04N 5/2353 348/396.1 |
| 8,368,803 B2* | 2/2013 | Ivashin | .............. | H04N 5/23222 348/180 |
| 8,610,778 B2* | 12/2013 | Krogstad | ............... | G03B 21/53 348/189 |
| 8,669,997 B2* | 3/2014 | Kotani | ..................... | H04N 9/31 345/581 |
| 8,698,901 B2* | 4/2014 | Hong | ........................... | 348/187 |
| 8,727,539 B2* | 5/2014 | Todoroki | ............. | H04N 9/3194 348/746 |
| 8,777,418 B2* | 7/2014 | Wright | ................... | G03B 21/14 353/121 |

(Continued)

FOREIGN PATENT DOCUMENTS

JP   A-2010-288062   12/2010

Primary Examiner — Bao-Luan Le
(74) Attorney, Agent, or Firm — Oliff PLC

(57) ABSTRACT

A projector includes a projection section that projects a plurality of patterns having lightness values different from each other, an imaging section that captures an image of the plurality of patterns projected by the projection section, and a projection state adjustment section that adjusts, based on any of the plurality of patterns captured by the imaging section, a projection state in which the projection section performs projection.

7 Claims, 8 Drawing Sheets

(56) References Cited

U.S. PATENT DOCUMENTS

| | | | | |
|---|---|---|---|---|
| 8,884,979 B2* | 11/2014 | Haraguchi | H04N 9/3194 | 345/585 |
| 2003/0215129 A1* | 11/2003 | Yang | G06T 7/0002 | 382/149 |
| 2005/0207027 A1* | 9/2005 | Miyasaka | | 359/696 |
| 2006/0227298 A1* | 10/2006 | Matsumoto | H04N 3/2335 | 353/69 |
| 2007/0171380 A1* | 7/2007 | Wright | G03B 21/14 | 353/69 |
| 2009/0091623 A1* | 4/2009 | Krogstad | G03B 21/53 | 348/189 |
| 2011/0019108 A1* | 1/2011 | Nelson | H04N 9/31 | 348/745 |
| 2011/0025988 A1* | 2/2011 | Haraguchi | H04N 9/3185 | 353/70 |
| 2011/0032381 A1* | 2/2011 | Nara | H04N 5/2353 | 348/229.1 |
| 2011/0058098 A1* | 3/2011 | Ivashin | H04N 5/23222 | 348/362 |
| 2011/0148904 A1* | 6/2011 | Kotani | H04N 9/31 | 345/589 |
| 2011/0279738 A1* | 11/2011 | Takahashi et al. | | 348/744 |
| 2012/0013634 A1* | 1/2012 | Haraguchi | H04N 9/3194 | 345/589 |
| 2012/0057138 A1* | 3/2012 | Haraguchi | G03B 21/00 | 353/85 |
| 2012/0105813 A1* | 5/2012 | Todoroki | H04N 9/3194 | 353/69 |
| 2012/0182416 A1* | 7/2012 | Kawaguchi | H04N 9/3185 | 348/128 |
| 2013/0021585 A1* | 1/2013 | Tamura | G09G 5/00 | 353/69 |
| 2013/0278779 A1* | 10/2013 | Hong | | 348/187 |
| 2013/0278906 A1* | 10/2013 | Yanagita | G02B 26/101 | 353/85 |

* cited by examiner

PROJECTOR AND ADJUSTMENT METHOD USING A PLURALITY OF PATTERNS HAVING DIFFERENT LIGHTNESS VALUES

The entire disclosure of Japanese Patent Application No. 2013-071614, filed Mar. 29, 2013 is expressly incorporated by reference herein.

BACKGROUND

1. Technical Field

The present invention relates to a projector and an adjustment method.

2. Related Art

Some projectors perform focus adjustment associated therewith by projecting a pattern image having a variety of grayscales. For example, in the technology described in JP-A-2010-288062, a projector includes a projection section that projects a calibration image containing at least one pattern image having at least three different grayscales on a projection screen, an imaging section that captures the calibration image to produce a captured image, a projection distance information generation section that generates projection distance information representing a projection distance that is the distance to the projection screen based on the captured image, and a focus adjustment section that performs focus adjustment of an image projected by the projection section based on projection distance information.

To calculate precise coordinates of a measurement point contained in the pattern image captured by the imaging section, the pattern image needs to be so captured that the captured image has an appropriate lightness value. The appropriate lightness value is a lightness value that is not saturated at the white end but is as great as possible. When the pattern image in the captured image captured by the imaging section is so bright that the lightness value is saturated, however, using the technology described in JP-A-2010-288062 does not allow detection of a current lightness value. In this case, it is necessary to adjust the exposure time and the gain, undesirably resulting in a long adjustment period. The related art therefore has a problem of insufficient convenience of a user who installs the projector.

SUMMARY

An advantage of some aspects of the invention is to provide a projector and an adjustment method that allow improvement in convenience of a user who installs a projector.

(1) An aspect of the invention relates to a projector including a projection section that projects a plurality of patterns having lightness values different from each other, an imaging section that captures an image of the plurality of patterns projected by the projection section, and a projection state adjustment section that adjusts, based on any of the plurality of patterns captured by the imaging section, a projection state in which the projection section performs projection.

According to the configuration described above, the projector can adjust the projection state in a short period by selecting any of the captured plurality of patterns having different lightness values, whereby automatic correction functions can be performed in a short period. As a result, the convenience of a user who installs the projector can be improved.

(2) Another aspect of the invention relates to the projector described above, in which the projection state adjustment section adjusts the projection state based, among the plurality of patterns, on a pattern so captured that the pattern has a lightness value within a predetermined range.

According to the configuration described above, the projector can adjust the projection state in a short period by selecting any of the captured plurality of patterns having different lightness values.

(3) Another aspect of the invention relates to the projector described above, in which the projection state adjustment section corrects trapezoidal distortion that occurs when the projection section performs projection.

According to the configuration described above, the projector can correct trapezoidal distortion based on any of the captured plurality of patterns having different lightness values.

(4) Another aspect of the invention relates to the projector described above, in which the projection state adjustment section performs focus adjustment on an image projected by the projection section.

According to the configuration described above, the projector can perform the focus adjustment based on any of the captured plurality of patterns having different lightness values.

(5) Another aspect of the invention relates to the projector described above, which further includes an imaging condition adjustment section that adjusts, based on any of the plurality of patterns captured by the imaging section, an imaging condition under which the imaging section performs imaging.

According to the configuration described above, the projector can adjust the imaging condition based on any of the captured plurality of patterns having different lightness values.

(6) Another aspect of the invention relates to the projector described above, in which the imaging condition adjustment section adjusts at least one of exposure based on which the imaging section performs imaging and the magnitude of gain of an analog-digital conversion circuit provided in the imaging section.

According to the configuration described above, the projector can adjust at least one of exposure based on which the imaging section performs imaging and the magnitude of gain of an analog-digital conversion circuit provided in the imaging section.

(7) Another aspect of the invention relates to a projector including a projection section that projects a pattern image containing a measurement pattern and an auxiliary pattern having a lightness value smaller than the lightness value of the measurement pattern, an imaging section that captures the pattern image projected by the projection section, an imaging condition adjustment section that adjusts, based on the lightness value of the auxiliary pattern when the lightness value of the measurement pattern captured by the imaging section is saturated, an imaging condition under which the imaging section performs imaging, and a projection state adjustment section that adjusts, based on the measurement pattern captured under the imaging condition adjusted by the imaging condition adjustment section, a projection state in which the projection section performs projection.

According to the configuration described above, the projector can adjust the imaging condition and the projection state based on the lightness value of the auxiliary pattern even when the captured measurement pattern has a saturated lightness value, whereby automatic correction functions can be performed in a short period. As a result, the convenience of a user who installs the projector can be improved.

(8) Another aspect of the invention relates to an adjustment method including causing a projector to project a plurality of patterns having lightness values different from each other, capturing an image of the projected plurality of patterns, and adjusting a projection state of the projector based on any of the plurality of patterns captured in the capturing.

According to the configuration described above, the adjustment method allows adjustment of the projection state in a short period by selecting any of the captured plurality of patterns having different lightness values, whereby automatic correction functions can be performed in a short period. As a result, the convenience of a user who installs the projector can be improved.

As described above, according to the aspects of the invention, the convenience of a user who installs a projector can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below in detail with reference to the drawings.

Figure 1:
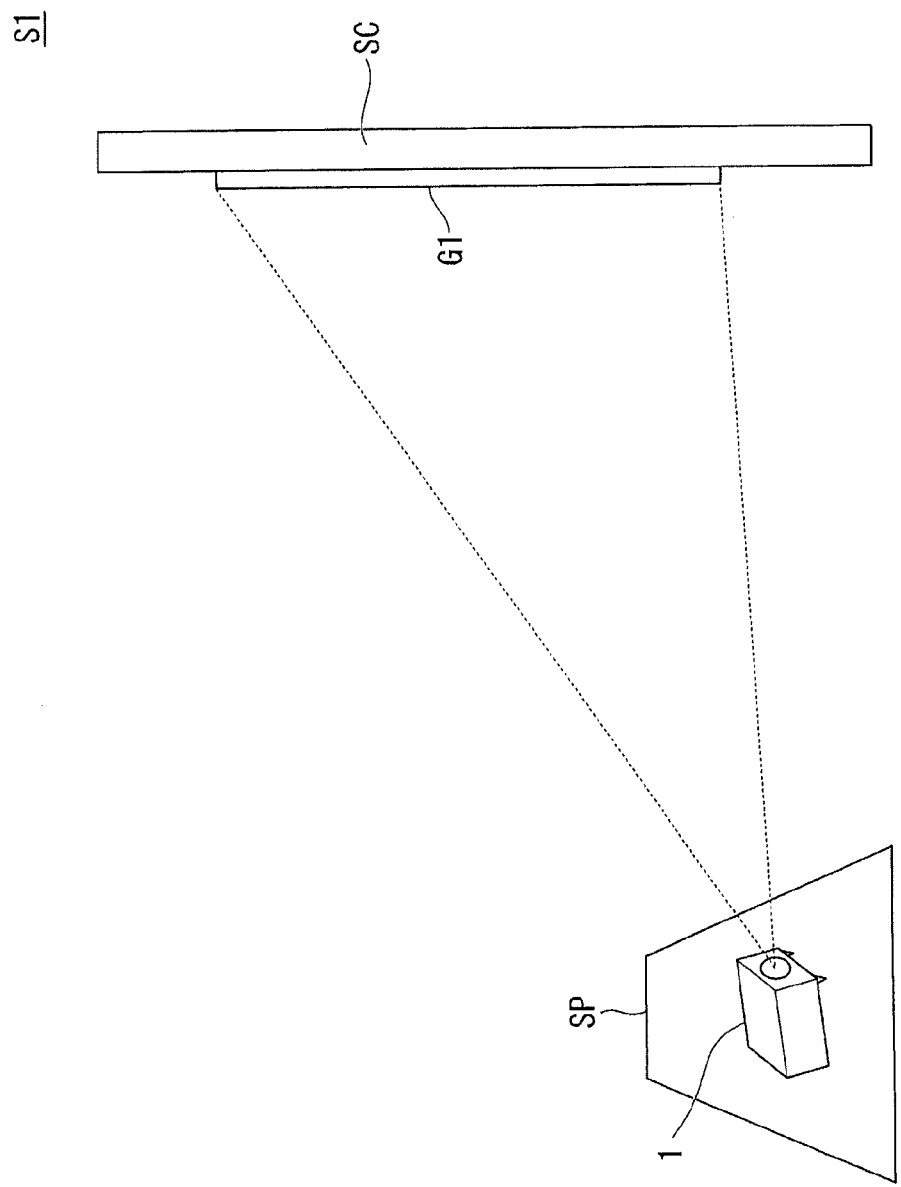
FIG. 1 is a schematic view showing an example of the configuration of a projection system according to a first embodiment of the invention.

FIG. 1 is a schematic view showing an example of the configuration of a projection system S1 according to the first embodiment of the invention.

The projection system S1 includes a projector 1, an installation base SP, on which the projector 1 is installed, and a projection screen SC, on which the projector 1 projects an image G1.

The projector 1 is in some cases placed on the installation base SP and projects the image G1 in an obliquely upward direction toward the projection screen SC. The projector 1 is in other cases installed on a ceiling and projects an image from the ceiling in an obliquely downward direction toward the projection screen SC. When an image is projected in an oblique direction toward the projection screen SC as described above, the image projected on the projection screen SC has a trapezoidally distorted shape. In the following description, the image G1 projected by the projector 1 is referred to as a projected image.

The projector 1 has a function of automatically correcting a trapezoidally distorted image (trapezoidal distortion adjustment function) and a function of automatically performing focus adjustment (focus adjustment function). To make the adjustments, the projector 1 projects a pattern image for adjustment, captures the pattern image, and detects the angle of projection with respect to the projection screen SC and the distance to the projection screen SC. The projector 1 further has a function of adjusting imaging conditions (exposure time and gain of analog-digital conversion circuit, for example) under which an image is captured to allow the projector 1 to capture the pattern image with appropriate image quality.

Figure 2:
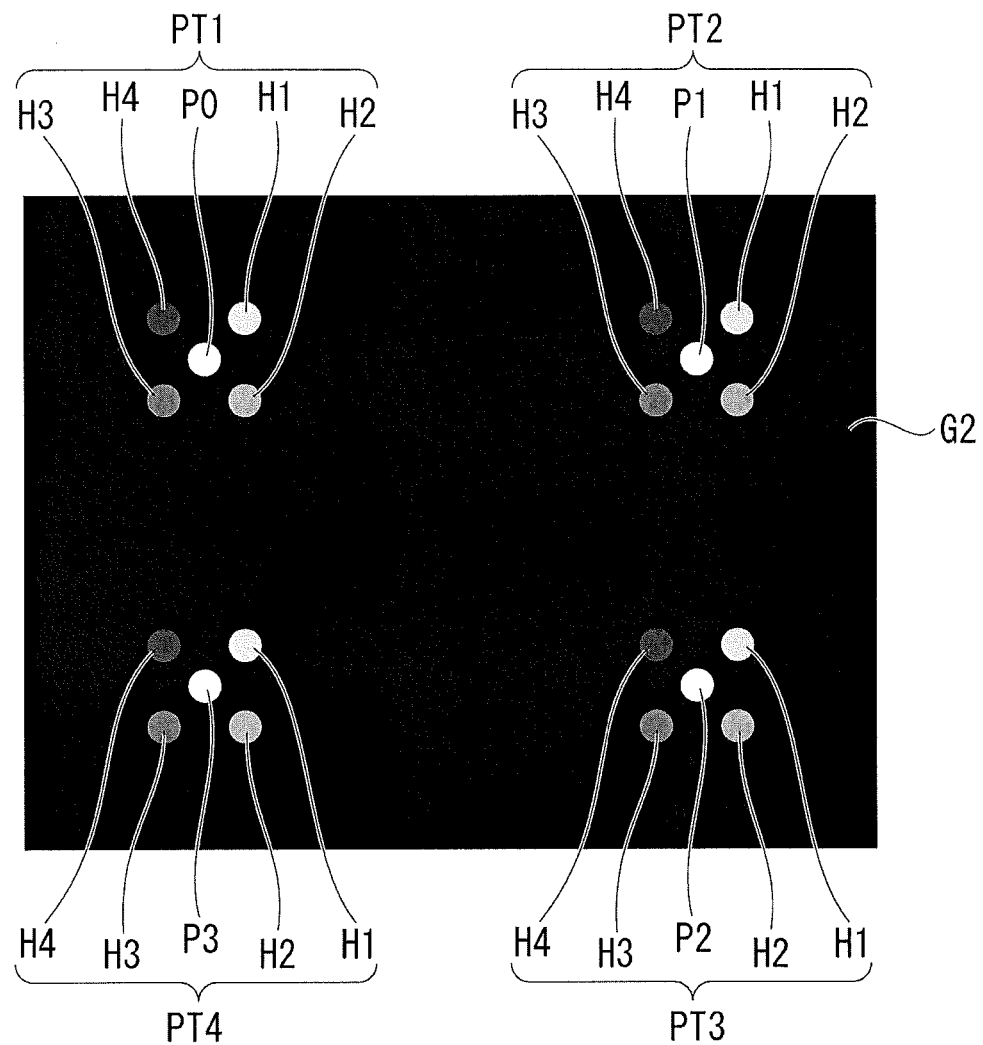
FIG. 2 is a schematic view showing an example of the arrangement of a pattern image projected by a projector according to the first embodiment.

FIG. 2 is a schematic view showing an example of the pattern image projected by the projector 1 according to the present embodiment.

As shown in FIG. 2, a pattern image G2 contains four measurement points P0, P1, P2, and P3 displayed in a bright color (white, for example) against a dark color (black, for example) background. Four auxiliary points H1, H2, H3, and H4 having different lightness values are disposed in the vicinity of (around) each of the measurement points P0, P1, P2, and P3. In the present embodiment, each of the measurement points P0, P1, P2, and P3 and the auxiliary points H1, H2, H3, and H4 has a circular pattern. Now, a portion containing one measurement point and four auxiliary points therearound, that is, a portion containing five circular patterns is referred to as a measurement pattern portion. That is, the pattern image G2 contains four measurement pattern portions PT1, PT2, PT3, and PT4. The four measurement points P0, P1, P2, and P3 has the same lightness value. The lightness values of the auxiliary points H1, H2, H3, and H4 are smaller than the lightness value of the measurement points P0, P1, P2, and P3 and one-half, one-fourth, one-eighth, and one-sixteenth the lightness value of the measurement points P0, P1, P2, and P3, respectively.

Figure 3:
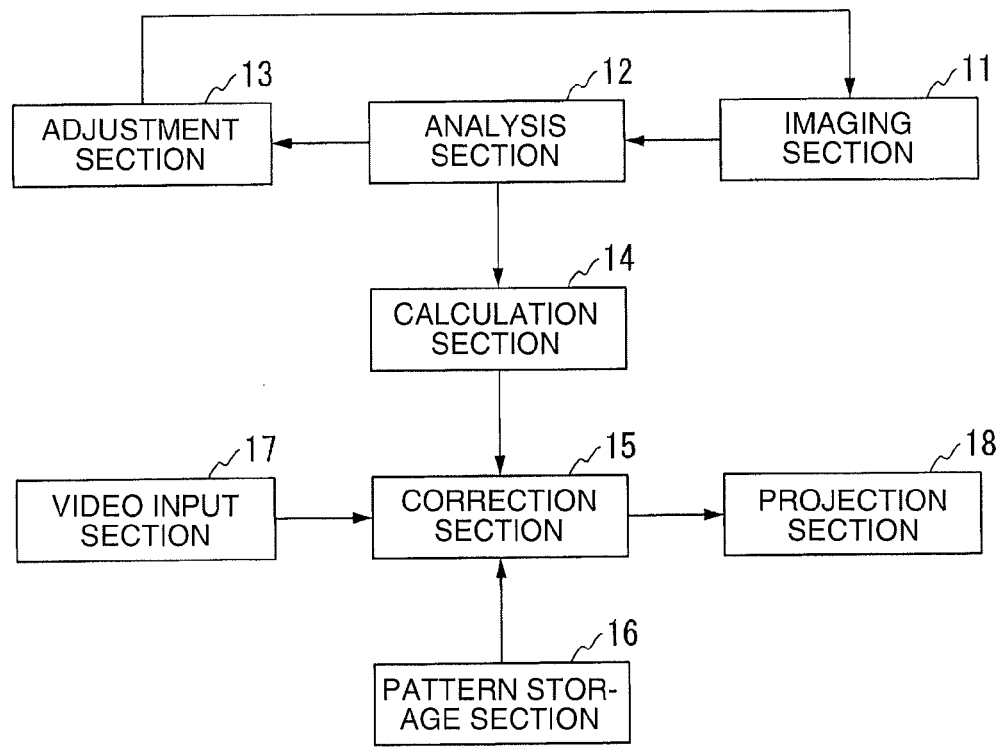
FIG. 3 is a schematic block diagram showing an example of the configuration of the projector according to the first embodiment.

FIG. 3 is a schematic block diagram showing an example of the configuration of the projector 1 according to the present embodiment.

The projector 1 includes an imaging section 11, an analysis section 12, an adjustment section 13, a calculation section 14, a correction section 15, a pattern storage section 16, a video input section 17, and a projection section 18. The projector 1 further has other functions of a typical projector, which will not be illustrated or described.

The imaging section 11 includes an imaging device (not shown), such as a CCD (charge coupled device) sensor and a CMOS (complementary metal oxide semiconductor) sensor, and an imaging lens (not shown). The imaging section 11 is, for example, disposed in the vicinity of a projection lens (not shown) of the projector 1 and performs imaging by capturing an image of an area containing a projected image projected by the projection section 18 on the projection screen SC and forming the captured image on the imaging device at a predetermined frame rate.

The imaging section 11 captures the pattern image projected by the projector 1 (projection section 18). The imaging section 11 then produces image information representing the image captured by the imaging section 11 (hereinafter referred to as captured image) and outputs the produced image information to the analysis section 12.

The analysis section 12 analyzes the image information inputted from the imaging section 11, that is, the image information on the captured image or the captured pattern image to determine whether or not the measurement points contained in the pattern image have appropriate brightness. When the measurement points have appropriate brightness, the analysis section 12 outputs the image information on the captured image to the calculation section 14. When the measurement points do not have appropriate brightness, the analysis section 12 outputs brightness information on the brightness of the measurement points to the adjustment section 13.

The adjustment section 13 derives adjustment values for adjusting the imaging conditions under which the imaging section 11 performs imaging (exposure, gain, and other adjustment values) based on the brightness information inputted from the analysis section 12. The adjustment section 13 uses the derived adjustment values to set the adjustment values in the imaging section 11 to adjust the imaging conditions, such as exposure and gain.

The calculation section 14 identifies the coordinates of the position of the measurement point in each of the measurement pattern portions based on the image information on the captured image inputted from the analysis section 12. The calculation section 14 then calculates a focus adjustment value for focus adjustment and a correction parameter for trapezoidal distortion correction based on the identified positional coordinates. For example, the calculation section 14 determines the projection distance based on the coordinates of the position of at least one of the measurement points to calculate a focus adjustment value according to the determined projection distance. The calculation section 14 further determines the angle of projection based on the coordinates of the positions of at least three of the measurement points to calculate the correction parameter according to the determined angle of projection. The calculation section 14 outputs the calculated focus adjustment value and correction parameter as correction value information to the correction section 15.

The correction section 15 uses the correction value information inputted from the calculation section 14 to correct an image projected by the projection section 18. Specifically, the correction section 15 performs focus adjustment on an image projected by the projection section 18 based on the focus adjustment value inputted from the calculation section 14. The correction section 15 then corrects an input image signal inputted from the video input section 17 in accordance with the correction parameter inputted from the calculation section 14 for trapezoidal distortion correction. The correction section 15 thus adjusts the projection state of the projection section 18 (trapezoidal distortion, focusing) in accordance with the correction value information calculated based on the pattern image.

The pattern storage section 16 stores the pattern image. The correction section 15 can read the pattern image from the pattern storage section 16 instead of reading an input image signal from the video input section 17 and project the read pattern image through the projection section 18.

The video input section 17 receives an input of an image signal from an external apparatus (personal computer, for example). The video input section 17 outputs the received image signal as an input image signal to the correction section 15.

The projection section 18 includes a discharge lamp, a liquid crystal panel, a spectroscopic device, a polarizing element, and a projection lens (none of them is shown) and projects an output image signal inputted from the correction section 15 as a projected image on the projection screen SC.

Figure 4:
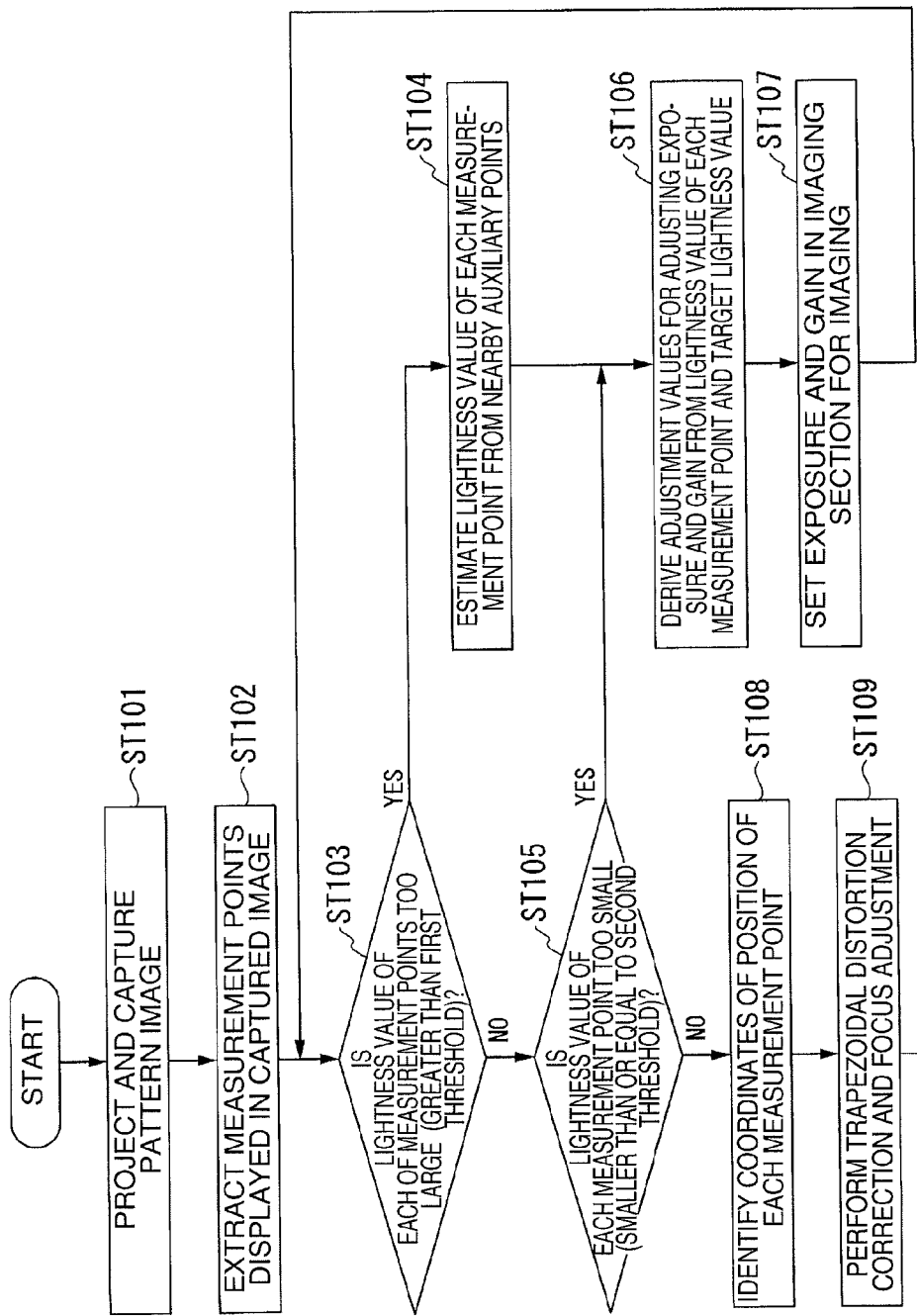
FIG. 4 is a flowchart showing an example of an adjustment process carried out by the projector according to the first embodiment.

FIG. 4 is a flowchart showing an example of an adjustment process carried out by the projector 1 according to the present embodiment.

In step ST101, the correction section 15 reads the pattern image from the pattern storage section 16 and outputs the read pattern image to the projection section 18, which projects the pattern image on the projection screen SC. The imaging section 11 captures the pattern image projected on the projection screen SC.

In step ST102, the analysis section 12 detects the measurement pattern portions from the captured image. The analysis section 12 extracts the measurement points from the detected measurement pattern portions.

In step ST103, the analysis section 12 determines whether or not the extracted measurement points have appropriate brightness. Specifically, the analysis section 12 compares the lightness value of each of the measurement points in the captured image with predetermined thresholds (first threshold and second threshold) and determines that the measurement point has appropriate brightness when the lightness value thereof is smaller than or equal to the first threshold and greater than the second threshold. The analysis section 12 first determines whether or not the lightness value of the measurement point is greater than the first threshold (whether or not the measurement point is too bright). When the lightness value of the measurement point is greater than the first threshold (when the measurement point is too bright) (YES), the control proceeds to step ST104. On the other hand, when the lightness value of the measurement point is smaller than or equal to the first threshold, that is, when the measurement point does not have too large a lightness value but has an unsaturated lightness value (brightness) (NO), the control proceeds to step ST105.

In step ST104, the analysis section 12 estimates the lightness value of the measurement point from the lightness values of the plurality of auxiliary points contained in the measurement pattern portion.

Figure 5:
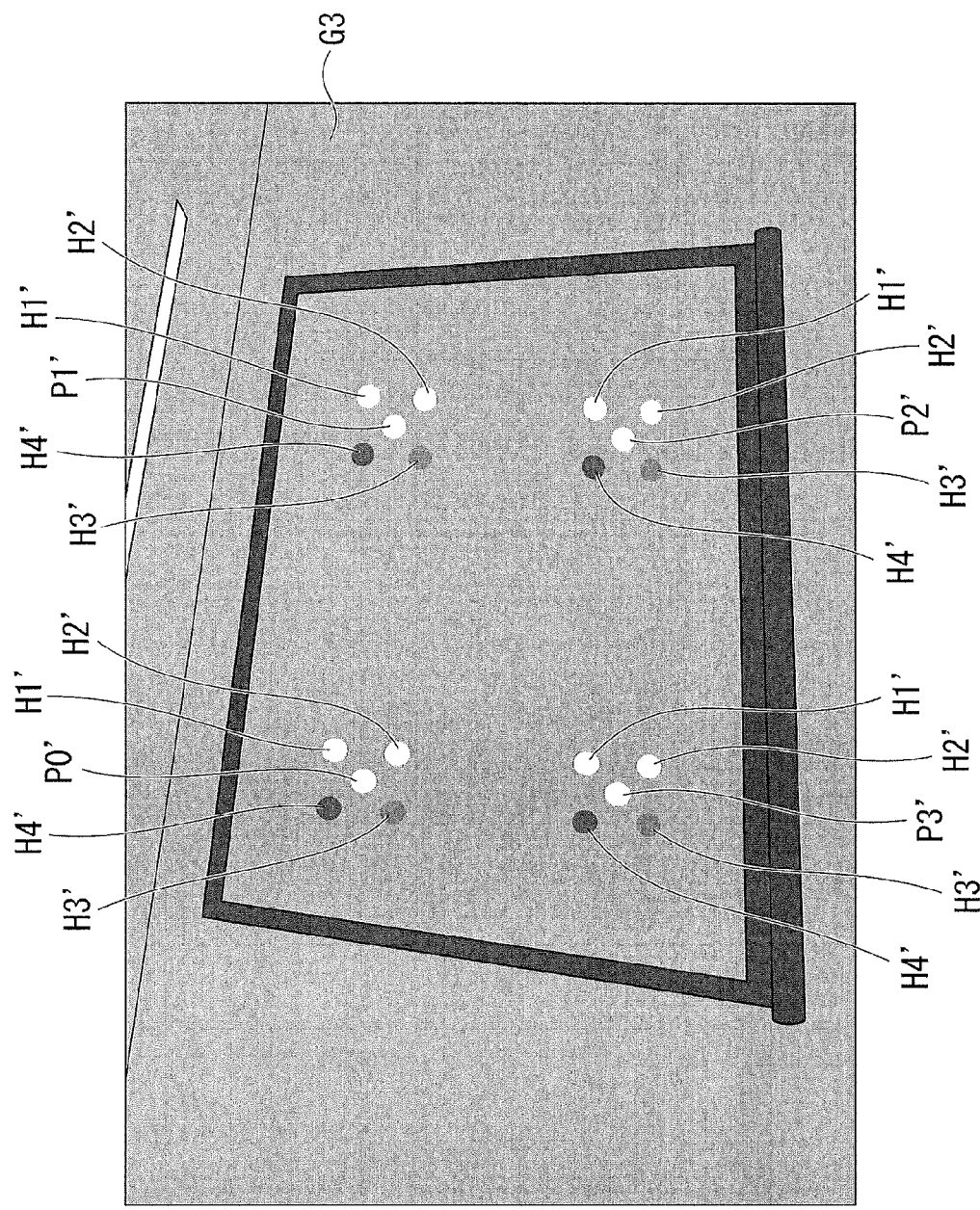
FIG. 5 is a schematic view showing an example of the pattern image captured by an imaging section according to the first embodiment.

FIG. 5 is a schematic view showing an example of the pattern image captured by the imaging section 11 according to the present embodiment.

A captured image G3 captured by the imaging section 11 contains the projection screen SC on which the pattern image is projected and an area around the projection screen SC. In the captured image G3, four measurement points P0', P1', P2', and P3' have been captured and displayed as too bright points having saturated lightness values. Further, among auxiliary points H1', H2', H3', and H4' disposed in the vicinity of each of the four measurement points P0', P1', P2', and P3', the auxiliary point H1', the lightness value of which is one-half the lightness value of the measurement point, and the auxiliary point H2', the lightness value of which is one-fourth the lightness value of the measurement point, also have saturated lightness values, whereas the auxiliary point H3', the lightness value of which is one-eighth the lightness value of the measurement point, and the auxiliary point H4', the lightness value of which is one-sixteenth the lightness value of the measurement point, have unsaturated lightness values. At this point, the analysis section 12 estimates the lightness value of each of the measurement points P0', P1', P2', and P3' based on one of the auxiliary points that have unsaturated lightness values, specifically, the brightest auxiliary point (the auxiliary point H3', the lightness value of which is one-eighth the lightness value of the measurement point). Specifically, the analysis section 12 estimates the lightness value of each of the measurement points P0', P1', P2', and P3' to be eight times the lightness value of the auxiliary point H3' in the captured image G3.

Referring to FIG. 4 again, in step ST104, the analysis section 12 outputs the estimated lightness value of each of the measurement points as brightness information to the adjustment section 13, and the control proceeds to step ST106.

In step ST106, based on the ratio of the lightness value of each of the measurement points inputted from the analysis section 12 to a predetermined lightness value corresponding to ideal brightness (target lightness value), the adjustment section 13 derives adjustment values for adjusting the exposure, gain, and other imaging conditions under which the imaging section 11 performs imaging.

In step ST107, the adjustment section 13 uses the derived adjustment values to set the adjustment values for adjusting the imaging conditions under which the imaging section 11 performs imaging, and the control returns to step ST103. The adjustment section 13 repeats the adjustment of the imaging conditions in corporation with the imaging section 11 and the analysis section 12 until each of the measurement points is so captured that it has an appropriate lightness value that is not saturated at the white end.

Figure 6:
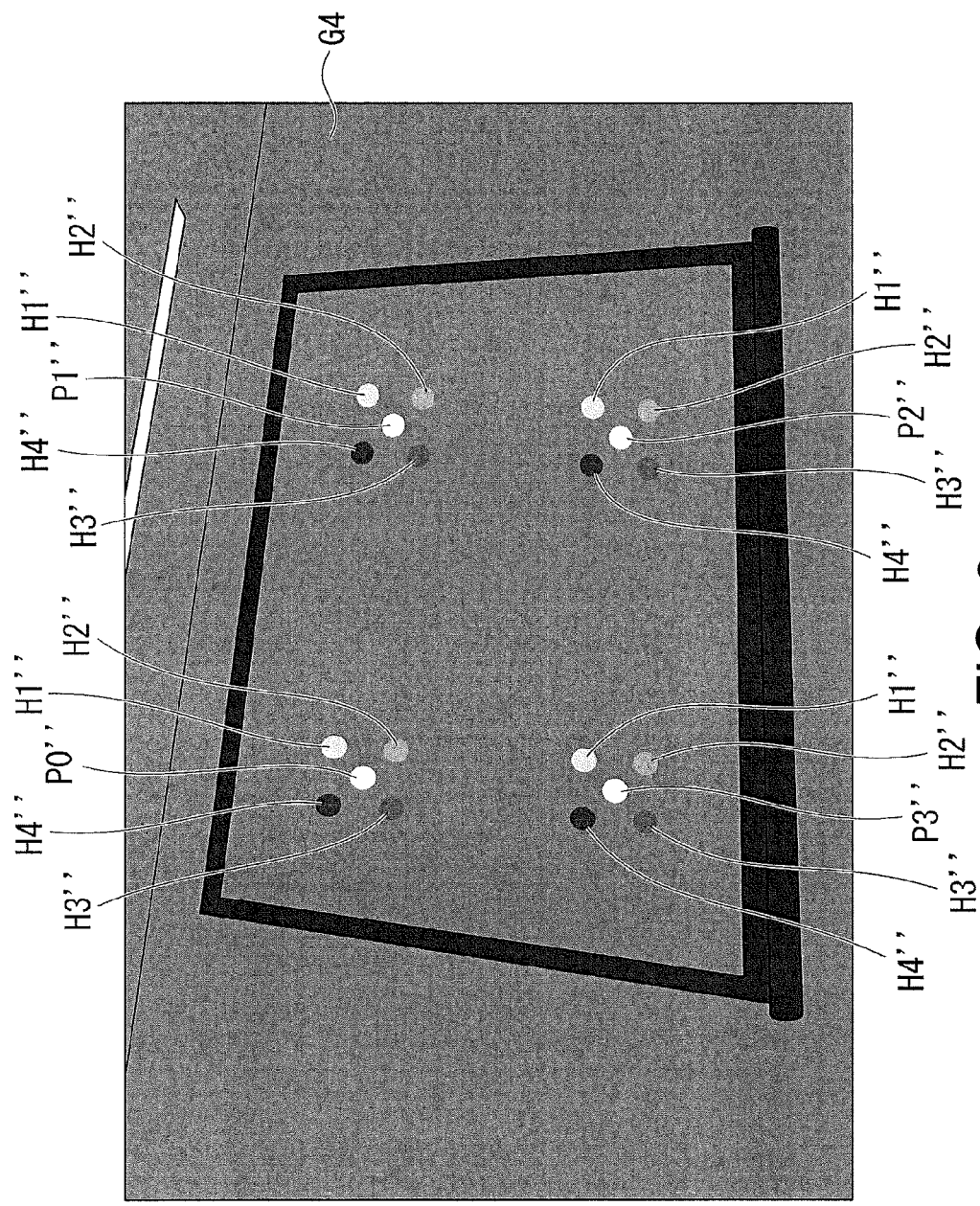
FIG. 6 is a schematic view showing an example of the pattern image after an adjustment section according to the first embodiment adjusts imaging conditions.

FIG. 6 is a schematic view showing an example of the pattern image after the adjustment section 13 according to the present embodiment adjusts the imaging conditions.

A captured image G4 is an image after the adjustment section 13 adjusts the exposure and gain of the imaging section 11 based on the pattern image in the captured image G3 shown in FIG. 5.

In FIG. 6, the four measurement points P0', P1', P2', and P3', each of which has a saturated lightness value, are changed to measurement points P0'', P1'', P2'', and P3'', each of which has an unsaturated appropriate lightness value, after the adjustment section 13 adjusts the exposure and gain of the imaging section 11.

Referring to FIG. 4 again, in step ST105, the analysis section 12 determines whether or not the lightness value of each of the measurement points in the captured image is smaller than or equal to the second threshold (whether or not the measurement point is too dim). When the lightness value of the measurement point is greater than the second threshold (the measurement point is not too dim) (NO), the analysis section 12 outputs the image information on the captured image to the calculation section 14, and the control proceeds to step ST108. On the other hand, when the lightness value of the measurement point is smaller than or equal to the second threshold, that is, when the measurement point is too dim (YES), the analysis section 12 outputs the lightness value of the measurement point in the captured image as brightness information to the adjustment section 13, and the control proceeds to step ST106.

In step ST108, the calculation section 14 identifies the coordinates of the position of each of the measurement points based on the image information on the captured image inputted from the analysis section 12. In this process, since each of the measurement points contained in the captured image has an appropriate lightness value, the calculation section 14 can accurately determine the coordinates of the position of each of the measurement points. The calculation section 14 then calculates the focus adjustment value for focus adjustment and the correction parameter for trapezoidal distortion correction based on the identified positional coordinates. The calculation section 14 outputs the calculated focus adjustment value and correction parameter as correction value information to the correction section 15.

In step ST109, the correction section 15 adjusts the projection state (trapezoidal distortion, focusing) in accordance with the inputted correction value information.

As described above, according to the present embodiment, the projector 1 includes the projection section 18, which projects a plurality of patterns having different lightness values, the imaging section 11, which captures an image of the plurality of patterns projected by the projection section 18, and a projection state adjustment section (correction section 15) that adjusts, based on any of the plurality of patterns captured by the imaging section 11, the projection state in which the projection section 18 performs projection.

The thus configured projector 1 can adjust the projection state in a short period by selecting any of the captured plurality of patterns having different lightness values, whereby the automatic correction functions can be performed in a short period. As a result, the convenience of the user who installs the projector can be improved.

Further, the projector 1 includes the projection section 18, which projects a pattern image containing a measurement pattern (measurement point) and an auxiliary pattern (auxiliary point) having a lightness value smaller than that of the measurement pattern (measurement point), the imaging section 11, which captures the pattern image projected by the projection section 18, an imaging condition adjustment section (adjustment section 13) that adjusts, based on the lightness value of the auxiliary pattern (auxiliary point) when the lightness value of the measurement pattern (measurement point) captured by the imaging section 11 is saturated, the imaging conditions under which the imaging section 11 performs imaging, and a projection state adjustment section (correction section 15) that adjusts, based on the measurement pattern (measurement point) captured under the imaging conditions adjusted by the imaging condition adjustment section (adjustment section 13), the projection state in which the projection section 18 performs projection.

The thus configured projector 1 can adjust the imaging conditions and the projection state based on the lightness value of the auxiliary pattern even when the captured measurement pattern has a saturated lightness value, whereby the automatic correction functions can be performed in a short period. As a result, the convenience of the user who installs the projector can be improved.

Second Embodiment

A second embodiment of the invention will be described below in detail with reference to the drawings.

In the first embodiment, a description has been made of the case where the lightness value of each of the measurement points is estimated from the lightness values of the auxiliary points associated with the measurement point and the imaging conditions are adjusted accordingly for adjustment of the projection state. In the present embodiment, a description will be made of a case where the projection state is adjusted based on either the auxiliary points or the measurement point.

Figure 7:
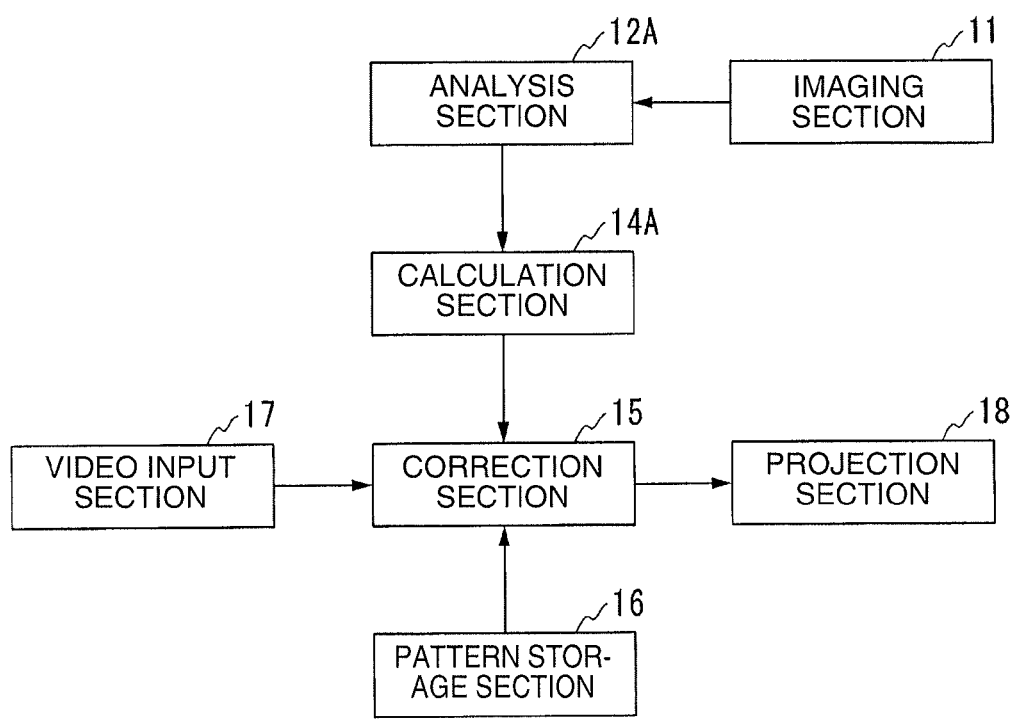
FIG. 7 is a schematic block diagram showing an example of the configuration of a projector according to a second embodiment of the invention.

FIG. 7 is a schematic block diagram showing an example of the configuration of a projector 1A according to the second embodiment of the invention.

The projector 1A includes an imaging section 11, an analysis section 12A, a calculation section 14A, a correction section 15, a pattern storage section 16, a video input section 17, and a projection section 18. The projector 1A further has other functions of a typical projector, which will not be illustrated or described.

Comparing the configuration of the projector 1 in the first embodiment with the configuration of the projector 1A in the present embodiment shows that the adjustment section 13 is omitted. The analysis section 12A and the calculation section 14A differ from those in the first embodiment in terms of operation and will therefore be described. The other components in the present embodiment are the same as those in the first embodiment and will therefore be not described.

The analysis section 12A analyzes image information inputted from the imaging section 11, that is, image information on a captured image or a captured pattern image to extract one measurement point or auxiliary point so captured that it has appropriate brightness from one measurement point and four auxiliary points in each of the measurement pattern portions. The analysis section 12A outputs the image information on the captured image and pattern information representing the extracted measurement point or auxiliary point to the calculation section 14A.

The calculation section 14A identifies the coordinates of the position of the measurement point or the auxiliary point contained in the pattern information inputted from the analysis section 12A based on the image information on the captured image inputted from the analysis section 12A. The calculation section 14A then calculates the focus adjustment value for focus adjustment and the correction parameter for trapezoidal distortion correction based on the identified positional coordinates. The calculation section 14A outputs the calculated focus adjustment value and correction parameter as correction value information to the correction section 15.

Figure 8:
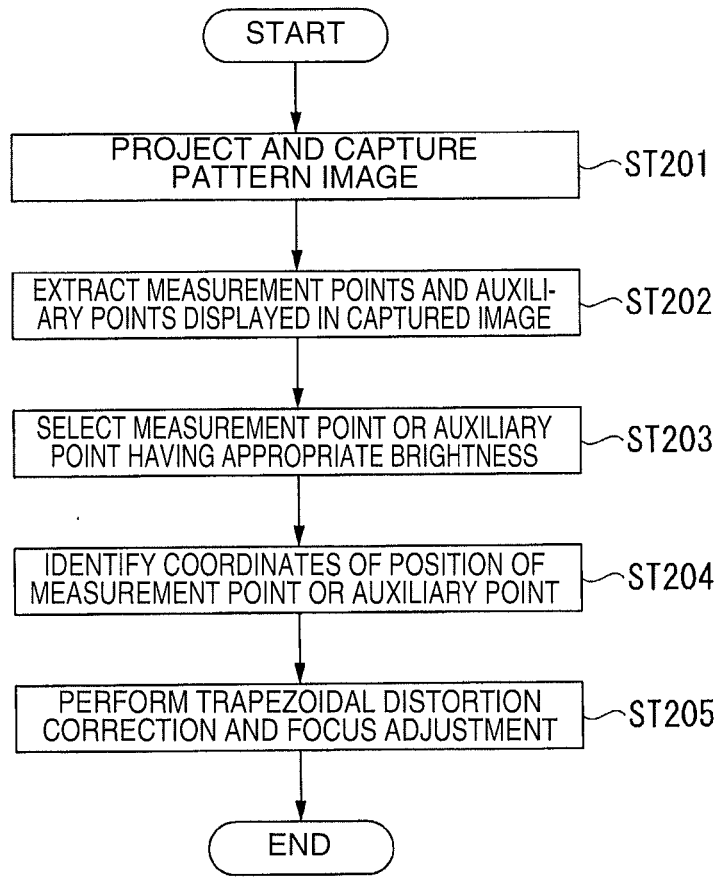
FIG. 8 is a flowchart showing an example of an adjustment process carried out by the projector according to the second embodiment.

FIG. 8 is a flowchart showing an example of an adjustment process carried out by the projector 1A according to the present embodiment.

In step ST201, the correction section 15 reads the pattern image from the pattern storage section 16 and outputs the read pattern image to the projection section 18, which projects the pattern image on the projection screen SC. The imaging section 11 captures the pattern image projected on the projection screen SC.

In step ST202, the analysis section 12A detects the measurement pattern portions from the captured image. The analysis section 12A extracts from the detected measurement pattern portions the patterns (auxiliary points and measurement points) contained in the measurement pattern portions.

In step ST203, the analysis section 12A selects one measurement point or auxiliary point so captured that it has appropriate brightness from the extracted auxiliary points and measurement point in each of the measurement pattern portions. Specifically, the analysis section 12A analyzes the image information to extract one measurement point or auxiliary point having a lightness value within a predetermined range from the measurement point contained in each of the measurement pattern portions and the plurality of auxiliary points disposed in the vicinity of the measurement point. The analysis section 12A outputs the image information on the captured image and pattern information representing the extracted measurement point or auxiliary point to the calculation section 14A.

In step ST204, based on the image information on the captured image inputted from the analysis section 12A, the calculation section 14A identifies the coordinates of the position of the measurement point or the auxiliary point contained in the pattern information inputted from the analysis section 12A. The calculation section 14A then calculates the focus adjustment value for focus adjustment and the correction parameter for trapezoidal distortion correction based on the identified positional coordinates. The calculation portion 14A outputs the calculated focus adjustment value and correction parameter as correction value information to the correction section 15.

In step ST205, the correction section 15 adjusts the projection state (trapezoidal distortion, focusing) in accordance with the inputted correction value information.

As described above, according to the present embodiment, the projector 1A includes the projection section 18, which projects a plurality of patterns having different lightness values, the imaging section 11, which captures the image of the plurality of patterns projected by the projection section 18, and a projection state adjustment section (correction section 15) that adjusts the projection state under which the projection section 18 performs projection based on any of the plurality of patterns captured by the imaging section 11.

The thus configured projector 1A can adjust the projection state in a short period by selecting any of the captured plurality of patterns having different lightness values, whereby the automatic correction functions can be performed in a short period. As a result, the convenience of the user who installs the projector can be improved.

In each of the embodiments described above, the description has been made by using the pattern image formed of four measurement pattern portions, but a pattern image formed only of one measurement pattern portion or a pattern image formed of a plurality of measurement pattern portions may instead be used. Further, in each of the embodiments described above, a plurality of auxiliary points are disposed around a measurement point, but a plurality of auxiliary points may be disposed in the vicinity of a measurement point in a single horizontal row or in a single vertical column or may be disposed in any layout as long as they are disposed in the vicinity of a measurement point. Further, the case where four auxiliary points are contained in a measurement pattern portion has been described, but only one auxiliary point or two or more auxiliary points may be contained in a measurement pattern portion.

Further, when each of the projectors 1 and 1A projects an image in an obliquely upward direction, a lower portion of the projected image tends to be brighter than an upper portion thereof. In this case, since a measurement point in the lower portion of the projected image tends to be saturated, the auxiliary points may be disposed only in a lower measurement pattern portion. Conversely, when each of the projectors 1 and 1A projects an image in an obliquely downward direction, an upper portion of the projected image tends to be brighter than a lower portion thereof. In this case, since a measurement point in the upper portion of the projected image tends to be saturated, the auxiliary points may be disposed only in an upper measurement pattern portion. Further, when it is expected that an image projected by each of the projectors 1 and 1A has portions different from each other in terms of lightness value or a high-lightness-value portion and a low-lightness-value portion, the auxiliary points may be so disposed in the projected image that the lightness values of auxiliary points disposed in the high-lightness-value portion and the lightness values of auxiliary points disposed in the low-lightness-value portion differ from each other.

Part or the entirety of each of the projectors 1 and 1A in the embodiments described above may be achieved by a computer. In this case, a program for achieving the control function of the projector may be stored on a computer readable storage medium, and the program stored on the storage medium may be read into a computer system and executed to achieve the control function.

The "computer system" used herein is assumed to be a computer system built in each of the projectors 1 and 1A and including an OS and a peripheral apparatus or any other type of hardware. Further, the "computer readable storage medium" used herein refers to a flexible disk, an magneto-optical disk, a ROM, a CD-ROM, and other portable media, and a hard disk drive and other storage devices built in the computer system. Moreover, the "computer readable storage medium" also includes a medium that dynamically holds a program for a short period, such as a communication line in a case where the program is transmitted via the Internet or any other network or a telephone network line or any other communication network line and a medium that holds a program for a fixed period, such as a volatile memory in a computer system that serves as a server or a client in the above situation. Further, the program described above may be a program that achieves part of the functions described above. Moreover, the functions described above may be achieved by any of the programs described above combined with a program having already been stored in the computer system.

Further, part or the entirety of each of the projectors 1 and 1A in the embodiments described above may be achieved in the form of an integrated circuit based, for example, on LSI (large scale integration). Each of the functional blocks of each of the projectors 1 and 1A may be individually implemented in the form of a processor or part or the entirety of the functional blocks may be integrated with each other in the form of a processor. A method for implementing the functional blocks in the form of an integrated circuit is not necessarily based on LSI but may be based on a dedicated circuit or a general-purpose processor. Further, when advances of semiconductor technologies allow advent of an integrated circuit technology that replaces LSI, an integrated circuit based on the technology may be used.

Embodiments of the invention have been described above in detail with reference to the drawings. The specific configurations are not limited to those described above, and a variety of design changes and other modifications can be made thereto to the extent that the changes and modifications do not depart from the substance of the invention.

What is claimed is:

1. A projection apparatus comprising:
   a projector that simultaneously projects a plurality of patterns, each having a lightness value different from lightness values of all of a remainder of the plurality of patterns;
   an imager that captures an image of the plurality of patterns simultaneously projected by the projector; and
   a processor configured to:
      determine that one pattern among the plurality of patterns captured by the imager has a lightness value within a predetermined range; and
      correct trapezoidal distortion that occurs when the projector performs projection based on the one pattern and not any other of the plurality of patterns.

2. The projection apparatus according to claim 1, wherein the processor is further configured to:
   perform focus adjustment on an image projected by the projector.

3. The projection apparatus according to claim 1, wherein the processor is further configured to:
   adjust an operation of the imager when performing imaging based on any of the plurality of patterns captured by the imager.

4. The projection apparatus according to claim 3, wherein the processor is further configured to:
   adjust at least one of exposure based on which the imager performs imaging and a magnitude of gain of an analog-digital conversion circuit provided in the imager.

5. The projection apparatus according to claim 1, wherein the trapezoidal distortion is corrected based on a position of the one pattern.

6. An adjustment method comprising:
   causing a projector to simultaneously project a plurality of patterns, each having lightness value different from lightness values of all of a remainder of the plurality of patterns;
   capturing an image of the simultaneously projected plurality of patterns;
   determining, using a processor, that one pattern among the captured plurality of patterns has a lightness value within a predetermined range; and
   correcting, using the processor, trapezoidal distortion of the projector based on the one pattern and not any other of the plurality of patterns.

7. The adjustment method according to claim 6, wherein the trapezoidal distortion is corrected based on a position of the one pattern.

* * * * *